United States Patent Office 2,863,925
Patented Dec. 9, 1958

2,863,925

PRODUCTION OF CYCLOHEXENYLMETHYL AND ALKYL SUBSTITUTED CYCLOHEXENYLMETHYL 2-ALKENYL ETHERS

Paul S. Starcher, Charleston, W. Va., assignor to Union Carbide Corporation, a corporation of New York No Drawing. Application May 31, 1956
Serial No. 588,244

7 Claims. (Cl. 260—611)

The present invention relates to ethers and to a method of preparing the same. More particularly this invention concerns the preparation of unsaturated ethers by reacting hydroxy containing unsaturated organic compounds in the presence of a suitable catalyst.

According to heretofore customary procedures it was known to prepare alkyl ethers from the reaction of an alkyl halide with an alkali metal salt of an alkyl alcohol. This classical reaction, as well as variations of it, are still extensively used. Another procedure for producing alkyl ethers is by reacting an alkyl halide with mercuric oxide.

These foregoing processes suffer from the disadvantage of using the expensive halides of the alkyl alcohols as one of the reactants and require an equivalent amount of a basic reagent which is not recoverable, and in some of the variations, the reactions are limited to the preparation of ethers in which the radicals are identical. Further, none of these reactions are catalytic in nature.

Other known methods start from the alkyl alcohol and employ reagents such as sulfuric acid and concentrated hydrochloric acid with zinc chloride. According to still another known process, the alcohol is heated with iodine in a vacuum. These latter non-catalytic reactions have the disadvantage, primarily, of employing corrosive dehydrating agents.

Mailhe and de Godon, Bull. Soc. Chim. (4), vol. 27, page 328 (1920) teach the preparation of dialkyl ether by passage of alkyl alcohol vapor over alumina at raised temperatures, and while this is a catalytic process it gives only a low yield of ether.

The use of mercuric oxide as a promoter for boron trifluoride has been extensively described for the preparation of acetals and ketals by addition of alcohols to acetylene.

The production of ethers using boron trifluoride promoted with mercuric oxide by hydration of olefins and the addition of alcohol to an olefin is also known.

The process of the present invention comprises forming a mixture of 3-cyclohexenemethanol or an alkyl substituted 3-cyclohexenemethanol, a second alcohol containing a carbon-to-carbon double bond between the carbon atoms adjacent to the hydroxy containing carbon, said double bonds being subject to a prototropic shift, and a catalyst composed of a mercury salt and an acidic compound containing boron and fluorine to cause the production of a mixed unsaturated ether of the non-allylic type 3-cyclohexenemethanol or alkyl substituted 3-cyclohexenemethanol and the second allylic type alcohol.

The reaction may take place at room temperature, and where necessary or desirable, the reaction rate can be increased by raising the temperature. The catalyst is prepared, either in situ or separate from the reactant alcohols, by mixing a solution of an acidic compound, such as boron trifluoride in diethyl ether with a mercury salt, for example mercuric oxide. If prepared separately, the catalyst mixture may be warmed to effect solution of the mercuric oxide. This is not necessary, however, as solution of the catalyst in the reaction mix soon occurs in any case.

The non-allylic 3-cyclohexenemethanol and alkyl substituted 3-cyclohexenemethanols are prepared by the Diels-Alder reaction of a diene and an alpha,beta-unsaturated aldehyde to form the corresponding 3-cyclohexenecarboxaldehyde or alkyl substituted 3-cyclohexenecarboxaldehyde (i. e., 1-ethyl-6-propyl-3-cyclohexenecarboxaldehyde is prepared from ethyl propyl acrolein and butadiene by this method. The aldehydes are subsequently converted to the corresponding alcohols by means of the Meerwin-Ponndorf-Verley reduction (i. e. aluminum isopropylate in isopropanol).

Th term "alkyl-substituted 3-cyclohexenemethanol" as it is employed throughout this specification is meant to encompass 3-methyl-3-cyclohexenemethanol, 4-methyl-3-cyclohexenemethanol, 6-methyl - 3 - cyclohexenemethanol, 2-methyl-3-cyclohexenemethanol, 5-methyl-3-cyclohexenemethanol, 1-methyl-3-cyclohexenemethanol, 3,6-dimethyl-3-cyclohexenemethanol, 3,4-dimethyl-3-cyclohexenemethanol, 3-methyl-6-ethyl-3-cyclohexenemethanol, 4-methyl-6-ethyl-3-cyclohexenemethanol, and 1-ethyl-6-propyl-3-cyclohexenemethanol.

The phrase "alcohol containing a carbon-to-carbon double bond between the carbon atoms adjacent to the hydroxy containing carbon atom" as it is employed throughout this specification is intended to embrace alcohols of the type

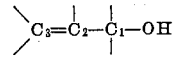

wherein substituents on the three carbons may be either hydrogen or lower alkyl groups containing 1 to 4 carbon atoms. Carbon atoms 1, 2 and 3 may also be taken as part of a ring system, singly, except carbon atom 2, by adjacent pairs, or altogether, i. e.

(a) Carbon atom 1 alone;

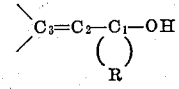

(b) Carbon atom 3 alone;

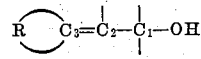

(c) Carbon atoms 1 and 2 together;

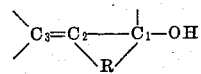

(d) Carbon atoms 2 and 3 together;

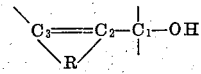

(e) All three carbon atoms together;

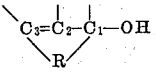

where the symbol "R" denotes a ring formed including the carbon atoms to which the symbol is attached. The alcohols cannot be tertiary ones possessing hydrogen on the carbon atoms adjacent the hydroxy containing carbon. Thus encompassed within this term are the primary allylic alcohols and primary alcohols having an allylic structural grouping, for example allyl alcohol, 2-ethyl-2-hexenol, crotyl alcohol, methallyl alcohol, 2-methyl-1-cyclohexenemethanol and benzyl alcohol; secondary allylic alcohols; and secondary alcohols having an allylic structural grouping for example, 2-cyclopentenol, 3-penten-2-ol, 2-cyclohexenol, 3-mathyl-3-penten-2-ol, 2-cyclohexylidene cyclohexanol, 2-ethylidene cyclohexanol, 3-hepten-2-ol, 4-methyl-4-hexen-3-ol, and methylphenylcarbinol; and tertiary allylic alcohols in which hydrogen is not present on the carbon in the beta position relative to the hydroxy containing carbon atom, for example, 1-isopropenyl-2,2,6,6 - tetramethylcyclohexanol and triphenylmethanol.

In alcohols where the grouping

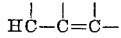

is present, a prototropic shift i. e.

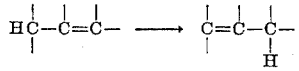

may occur in the product ether due to the influence of the catalyst. Hence ethers isomeric with those expected may be produced by the process of this invention and are also included within its scope.

The catalyst employed herein, is one prepared, preferably, from boron trifluoride and mercuric oxide. The nature of this catalytic agent or activator is not, however, precisely known. It has been reported that when boron trifluoride is mixed with methyl alcohol a coordination compound, $CH_3OHBF_3$ is formed and that a mercury derivative of this compound, mercuric methoxyfluoborate, $Hg(CH_3OBF_3)_2$, was isolated. Since boron trifluoride reacts in a similar manner with other alcohols, it is conceivable that some mercuric allyloxy fluoborate, $Hg(CH_2=CH-CH_2OBF_3)_2$ is present in carrying out my process. Other compounds of mercury and the hydrolysis products of boron trifluoride are known, such as monoaquomonohydrofluoromercury (I) fluoborate, $$[Hg(HF)(H_2O)]BF_4$$

and mercuric fluoborate, $Hg(BF_4)_2$. These and other mercurous and mercuric salts of acidic compounds of boron and fluorine may be used as the actual catalyst in the reaction solution. Examples of these are mercuric dihydroxyfluoborate; mercuric methoxyfluoborate; the addition compound of mercuric dihydroxyfluoborate and boron trifluoride; and the addition compound of boron trifluoride etherate, mercuric oxide and trichloracetic acid.

The amount of catalyst to be employed is not narrowly critical and may be varied considerably without adversely affecting the reaction. While no advantage can be seen from increasing the concentrations of catalyst over those shown in the examples following, a less preferred limit within the scope of the present invention permits use of 0.01 percent of mercuric oxide and 0.03 percent of boron trifluoride or equivalent amounts of other mercurous and mercuric salts of acidic compounds of boron and fluorine by weight of the reactant alcohols. Below these limits the rate of reaction is considerably reduced. The upper limit for catalyst concentration is an economic rather than a chemical one. No advantage or necessity is seen in employing catalyst concentrations higher than 3 percent mercuric oxide and 2 percent boron trifluoride, again, by weight of the reactant alcohols.

The catalytic agent or activator not only accelerates the rate of the chemical reaction by which the allylic ethers are prepared, but serves also to direct the course of the reaction so that a preponderant yield of the desired allylic ether product is secured.

Any inert organic hydrocarbon solvent may be employed for the reaction, although it should be noted that the presence of a solvent is neither critical nor necessary for the practice of the present invention, for example, aliphatic hydrocarbons, e. g. hexane and petroleum ether; ethers, e. g. di-n-butyl ether, diethyl ether and chlorinated hydrocarbons, e. g. ethylene dichloride and methylene dichloride.

Separation of the water of reaction occurs on standing of the reaction mixture at room temperature or somewhat above, and the insoluble mixed ethers of the present invention then appear as a separate phase. The reaction may be hastened or driven farther toward completion by removal of the water by a suitable dehydrating agent, such as alumina, or by distillation with a chemically inert material such as, for example, hexane or toluene, forming an azeotrope with water. Similar processes may be applied for removal of the product ethers. When the reaction is complete the catalyst is generally neutralized with a base and the ethers are recovered by a suitable distillation procedure.

The preferred temperature range for obtaining a satisfactory yield of the product ethers is between 25° C. and the boiling point of the reactant mixture at the working pressure. No advantage is seen in employing temperatures substantially below 25° C., since the rate of reaction then is slowed down considerably.

It should be noted that there is nothing critical about the molar ratio of the reactants. Any mol ratio is operative and if a particular reaction is sluggish a considerable excess (e. g. one hundred fold or more) of one of the reactants may be introduced into the reaction mix.

The ethers of the present invention may be used to form copolymers with, for example, vinyl chloride or acrylonitrile which are normally suitable as plastics, coatings and films.

The following example is illustrative of the invention, but is not to be construed as limiting the scope thereof.

*Example 1*

To a mixture of 348 grams of allyl alcohol (6 mols) and 336 grams of 3-cyclohexenemethanol (3 mols) was added 9.5 grams of red mercuric oxide and 6 grams of a boron trifluoride-ether complex (41 percent $BF_3$) while stirring. The reaction mixture was allowed to stand at room temperature for 42 hours with occasional stirring. The catalyst was neutralized with 42 grams of potassium carbonate. Distillation of the reaction mixture gave a 45 percent yield of allyl 3-cyclohexenylmethyl ether (203 grams) which was contaminated with about 25 percent of 3-cyclohexenemethanol (114 grams). This mixture could not be separated on ordinary laboratory columns either by fractionation or steam distillation. Another run in which the allyl alcohol/3-cyclohexenemethanol ratio was raised to 4 to 1 gave a 52 percent yield of the ether.

Purification of the allyl 3-cyclohexenylmethyl ether was accomplished by treating the mixture of the ether and 3-cyclohexenemethanol with a slight excess of phthalic anhydride at 150° C. for a few minutes. The ether was then flashed from the monotetrahydrobenzyl phthalate and fractionated on a 2 ft. column packed with glass helices. High purity allyl 3-cyclohexenylmethyl ether having the following properties was obtained.

Boiling point _____ 60–61° C. at 4 mm.
Refractive index _____ 1.4620–22 ($n_D^{30}$).
Purity by bromination _____ 99 percent.
Percent carbon:
    Found _____ 78.8.
    Calc. _____ 78.9.
Percent hydrogen:
    Found _____ 10.6.
    Calc. _____ 10.52.

The infrared spectrum showed absorptions characteristic of the ether group, the terminal vinyl type double bond, and the cis internal double bond. No absorption characteristic of OH groups was found.

I claim:

1. A method for producing cyclohexenylmethyl and alkyl substituted cyclohexenylmethyl 2-alkenyl ethers which comprises forming a mixture of a member selected from the group consisting of 3-cyclohexenemethanol, 3-methyl-3-cyclohexenemethanol, 4-methyl-3-cyclohexenemethanol, 6-methyl-3-cyclohexenemethanol, 2-methyl-3-cyclohexenemethanol, 5-methyl-3-cyclohexenemethanol, 1 - methyl - 3 - cyclohexenemethanol, 3,6 - dimethyl - 3-cyclohexenemethanol, 3,4-dimethylcyclohexenemethanol, 3 - methyl - 6 - ethyl - 3 - cyclohexenemethanol, 4- methyl - 6 - ethyl - 3 - cyclohexenemethanol, and 1-ethyl-6-propyl-3-cyclohexenemethanol together with an alcohol containing a carbon-to-carbon double bond between the carbon atoms adjacent to the hydroxy containing carbon and a catalyst selected from the group consisting of boron trifluoride and mercuric oxide, mercuric methoxyfluoborate, monoaquomonohydrofluoromercury (I) fluoborate, mercuric fluoborate, mercuric dihydroxyfluoborate, the addition compound of mercuric dihydroxyfluoborate and boron trifluoride, and the addition compound of boro trifluoride etherate, mercuric oxide and trichloroacetic acid.

2. A method for producing cyclohexenylmethyl and alkyl substituted cyclohexenylmethyl 2-alkenyl ethers which comprises forming a mixture of a member selected from the group consisting of 3-cyclohexenemethanol, 3-methyl - 3 - cyclohexenemethanol, 4 - methyl - 3 - cyclohexenemethanol, 6 - methyl - 3 - cyclohexenemethanol, 2 - methyl - 3 - cyclohexenemethanol, 5 - methyl - 3- cycylohexenemethanol, 1 - methyl - 3 - cyclohexenemethanol, 3,6 - dimethyl - 3 - cyclohexenemethanol, 3,4 - dimethylcyclohexenemethanol, 3 - methyl - 6 - ethyl - 3- cyclohexenemethanol, 4 - methyl - 6 - ethyl - 3 - cyclohexenemethanol, and 1 - ethyl - 6 - propyl - 3 - cyclohexenemethanol together with an alcohol containing a carbon-to-carbon double bond between the carbon atoms adjacent to the hydroxy containing carbon and a catalyst selected from the group consisting of boron trifluoride and mercuric oxide, mercuric methoxyfluoborate, monoaquomonohydrofluoromercury (I) fluoborate, mercuric fluoborate, mercuric dihydroxyfluoborate, the addition compound of mercuric dihydroxyfluoborate and boron trifluoride, and the addition compound of boron trifluoride etherate, mercuric oxide and trichloroacetic acid.

3. A method for producing cyclohexenylmethyl and alkyl substituted cyclohexenylmethyl 2-alkenyl ethers which comprises forming a mixture of 3-cyclohexenemethanol, an alcohol containing a carbon-to-carbon double bond between the carbon atoms adjacent to the hydroxy containing carbon and a catalyst selected from the group consisting of boron trifluoride and mercuric oxide, mercuric methoxyfluoborate, monoaquomonohydrofluoromercury (I) fluoborate, mercuric fluoborate, mercuric dihydroxyfluoborate, the addition compound of mercuric dihydroxyfluoborate and boron trifluoride, and the addition compound of boron trifluoride etherate, mercuric oxide and trichloroacetic acid.

4. A method for producing cyclohexenylmethyl 2-alkenyl ethers which comprises forming a mixture of 3-cyclohexenemethanol, an alcohol containing a carbon-to-carbon double bond between the carbon atoms adjacent to the hydroxy containing carbon and a catalyst selected from the group consisting of boron trifluoride and mercuric oxide, mercuric methoxyfluoborate, monoaquomonohydrofluoromercury (I) fluoborate, mercuric fluoborate, mercuric dihydroxyfluoborate, the addition compound of mercuric dihydroxyfluoborate and boron trifluoride, and the addition compound of boron trifluoride etherate, mercuric oxide and trichloroacetic acid.

5. A method for producing cyclohexenylmethyl 2-alkenyl ethers which comprises forming a mixture of 3-cyclohexenemethanol, an alcohol containing a carbon-to-carbon double bond between the carbon atoms adjacent to the hydroxy containing carbon and a catalyst composed of mercuric oxide and boron trifluoride and heating to a temperature from 25° C. to the boiling point of said mixture.

6. A method for producing cyclohexenylmethyl 2-alkenyl ethers which comprises forming a mixture of 3-cyclohexenemethanol, an alcohol containing a carbon-to-carbon double bond between the carbon atoms adjacent to the hydroxy containing carbon and a catalyst composed of mercuric oxide and boron trifluoride etherate and heating to a temperature from 25° C. to the boiling point of said mixture.

7. A method of producing allyl 3-cyclohexenylmethyl ether which comprises forming a mixture of 3-cyclohexenemethanol benzyl alcohol, allyl alcohol and a catalyst selected from the group consisting of boron trifluoride and mercuric oxide, mercuric methoxyfluoborate, monoaquomonohydrofluoromercury (I) fluoborate, mercuric fluoborate, mercuric dihydroxyfluoborate, the addition compound of mercuric dihydroxyfluoborate and boron trifluoride, and the addition compound of boron trifluoride etherate, mercuric oxide and trichloroacetic acid.

References Cited in the file of this patent
UNITED STATES PATENTS

| 2,471,922 | Axe | May 31, 1949 |

FOREIGN PATENTS

| 697,905 | Great Britain | Sept. 30, 1953 |

OTHER REFERENCES

Booth et al.: Boron Trifluoride and its Derivatives, pp. 176, 195 (1949).